United States Patent
Weng

(10) Patent No.: US 6,518,712 B2
(45) Date of Patent: Feb. 11, 2003

(54) METHOD AND APPARATUS FOR CONTROLLING THE OPERATION OF A LAMP

(75) Inventor: Da Feng Weng, Winchester, MA (US)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/989,146

(22) Filed: Nov. 21, 2001

(65) Prior Publication Data

US 2002/0047609 A1 Apr. 25, 2002

Related U.S. Application Data

(63) Continuation of application No. 08/989,433, filed on Dec. 12, 1997, now abandoned.

(51) Int. Cl.$^7$ .............................................. H05B 37/02
(52) U.S. Cl. ..................... 315/209 R; 315/224; 315/244
(58) Field of Search .................. 315/291, 307, 315/308, 224, 225, 209 R, 244, 219, DIG. 5

(56) References Cited

U.S. PATENT DOCUMENTS

| | | | |
|---|---|---|---|
| 4,553,070 A | | 11/1985 | Sairanen et al. ........ 315/209 R |
| 4,912,374 A | * | 3/1990 | Nagase et al. .............. 315/244 |
| 5,036,256 A | * | 7/1991 | Garrison et al. ............ 315/224 |
| 5,182,702 A | | 1/1993 | Hiramatsu .................. 363/132 |
| 5,357,173 A | | 10/1994 | Kachmarik et al. ..... 315/209 R |
| 5,463,281 A | * | 10/1995 | Linssen .................. 315/209 R |
| 5,742,132 A | * | 4/1998 | Huber et al. ................. 315/308 |
| 5,932,976 A | * | 8/1999 | Maheshwari et al. ... 315/209 R |

FOREIGN PATENT DOCUMENTS

JP          8124687      5/1996

OTHER PUBLICATIONS

J. R. Coaton and A. M. Marsden, Lamps and Lighting, 1997, Arnold and Contributors, 4th edition, pp. 293, 294.*
Modern Dictionary of Electronics, by Rudolf F. Graf, pp. 681 and 1056.
The Illustrated Dictionary of Electronics, by Stan Gibilisco, 1994, TAB Books, p. 211 and cover page.
Lamps and Lighting, 4th Edition, by Coaton and Marsden, 1997, pp. 324, 326, and cover page.

* cited by examiner

*Primary Examiner*—Don Wong
*Assistant Examiner*—Wilson Lee
(74) *Attorney, Agent, or Firm*—Greenblum & Bernstein, P.L.C.

(57) ABSTRACT

A circuit to start an HID lamp in a high-frequency start mode and, after starting, to operate the lamp in a low-frequency operating mode is controlled, during the high-frequency start mode, to drive the lamps with a voltage that includes a high-frequency component to ignite the lamp and a unipolar or bipolar offset component to keep the lamp ignited during a transition from the high-frequency start mode to the low-frequency operating mode.

11 Claims, 8 Drawing Sheets

METHOD AND APPARATUS FOR CONTROLLING THE OPERATION OF A LAMP

CROSS REFERENCE TO RELATED APPLICATION

This is a continuation of U.S. application Ser. No. 08/989,433, filed Dec. 12, 1997, abandoned on Nov. 26, 2001 the contents of which is incorporated by reference herein in it's entirety.

FIELD OF THE INVENTION

This invention relates to a circuit operation mode and control thereof suitable for igniting a high intensity (high pressure) discharge lamp without failure and at low cost and with low stresses on the circuit. The lamp is ignited by high frequency voltage and operated by a low frequency waveform.

DESCRIPTION OF THE PRIOR ART

In conventional electronic ballasts, specifically pulse started metal halide discharge lamp ballasts, an extra ignitor circuit is required. The ignition pulse amplitude specified by the lamp manufacturer is very high though it varies among manufacturers. Also, the width of the pulse has a minimum required value, typically 1.5 microseconds to 2.5 microseconds. To meet the starting pulse requirement, the ignitor may be complicated and expensive.

For example, FIGS. 1 and 5 illustrate circuit topographies found in, for example, U.S. Pat. No. 5,932,976, in which a high frequency resonant ignition technique is described. As shown in FIGS. 2 and 3 (or FIGS. 6 and 7), the lamp is operated using a high frequency starting operation and a low frequency steady-state operation. When the circuit is operated in the high frequency starting mode, a 50% duty-cycle high frequency square waveform is applied to the resonant circuit, formed by the inductor and capacitor, producing a high voltage to ignite the lamp. After detection of a lamp ignition, the switching mode changes to a low frequency steady-state operation. When the operating mode is changed from the starting operation to the steady-state operation, there is a delay time (as shown in FIGS. 4 and 8) which is caused by the filtering circuit of the detecting circuit. This delay causes instability of the discharge during transition from the glow to the arc, and the lamp may be easily extinguished. This phenomenon frequently happens when the lamp is not cooled down completely. In the illustrated circuit topology, the power control stage and the inverter stage are combined in a half-bridge/full-bridge topology. Since the power control (buck) stage is combined with the output inverter and the power circuit is working in a discontinuous current mode in a steady-state operation, the output inductor and the capacitor across the lamp must provide sufficient filtering to keep the high frequency component of the lamp current to a minimum in order to prevent an acoustic resonance. Consequently, the value of the capacitor must be large, in the order of, but not limited to, for example, 1/10 micro farads. Because of the large capacitance value and relatively small inductor value, a very large circulating current flows in the circuit during the high frequency starting operation.

In U.S. Pat. No. 5,182,702, a control scheme of unbalanced duty-cycle operation for a dimming control is described. The unbalanced duty-cycle operation control allows the ballast output current to stably be controlled at a fixed switching frequency.

SUMMARY OF THE INVENTION

The present invention overcomes the disadvantages of the above-mentioned technique and keeps the advantage of high frequency starting. The objective of the invention is to overcome the problems of the lamp extinguishing due to the delay time and the high circulating current in the prior art. Another objective of the invention is to simplify the circuit for igniting HID lamps and reduce the cost of the HID ballast.

The circuit of the present invention utilizes a half bridge (shown in FIG. 9) or a full bridge (shown in FIG. 12) inverter circuit to provide the HID lamp with low frequency current. The inverter also controls the lamp power and current. In the new igniting control scheme, at starting mode, the duty-cycle of the switches is modulated by the required output low frequency square waveform or a fixed amplitude DC signal and the voltage on the lamp is composed of the high frequency, high voltage plus the low frequency square waveform voltage or DC voltage as shown in FIGS. 11, 14, and 16. It is the high frequency, high voltage that breaks down the lamp and it is the low frequency square waveform voltage or DC voltage that pushes the lamp from the glow to the arc as the lamp is broken down. In this way, the lamp current can be set up in no delay time and then the lamp current is controlled by the current loop. Therefore the lamp can be ignited without failure.

In the inverter, during the steady-state, the current in the output inductor, which is a buck inductor, is continuous. There are separate current and voltage loops in the control circuit to control the lamp power and the lamp current. The current in the output inductor can be considered as a controllable current source. Due to the continuous current of the output inductor, the current ripple is low. Because of the low ripple on the output current, it isn't necessary to use a second order filter formed by the output inductor and the capacitor parallel with the lamp to filter out the high frequency ripple current through the lamp to avoid acoustic resonance. In this case, the value of the capacitor parallel with the lamp will be determined by the lamp ignition. Due to the low value of the capacitor, it is possible to make the resonant tank circulating current as low as possible and obtain a voltage magnitude high enough to ignite the lamp during the lamp igniting mode. Because of the low value of the capacitor, the output impedance of the resonant tank is too high to push the lamp from the glow to the arc and the lamp would be extinguished easily. However, a good lamp start condition is achieved as the lamp is broken down because there is a high enough low frequency energy to push the lamp from glow to arc. The new igniting control scheme is also utilized for CCM to reduce the circulating current at the starting mode. In the circuit, the output L, C, lamp resistor R network is a variable band-pass filter. When the filter is operating as a high Q circuit, the filter is a high frequency band-pass filter which allows resonant frequency pass through; when the filter is operating as a low Q circuit, the filter is a low pass filter. For the network, if we set up the exciting source with high frequency and low frequency components, the lamp resistor can be used to control the variable band-pass filter. That is, when the lamp resistance is high at the start-up mode, the network is a high Q high frequency band-pass filter; when the lamp resistance is low at steady-state mode, the network is a low Q low pass filter. In this way, the characteristics of the filter can automatically be controlled. Thus, an exciting source with high frequency and low frequency components is produced by the present new igniting control scheme. This exciting source can drive the network to produce a high enough high frequency voltage to break down the lamp and to transfer the low frequency energy to push the lamp from the glow to the arc automatically.

In the circuit, the output inductor has two functions. One is to work as a resonant inductor during lamp starting; the other is to work as a buck inductor to regulate the lamp power and the lamp current during lamp normal operation. Generally speaking, these two functions are contradictory. As a resonant inductor, it is required that the inductor value be low to obtain a low output impedance of the network; and as a buck inductor, it is required that the inductor value be high to make the output current ripple low to avoid the-acoustic resonance. There are some known ways to solve this problem. The easy way is changing the switching frequency between ignition mode and the steady state mode. That is, in the ignition mode, the switching frequency is low to obtain the low output impedance of the network; and in the steady state mode, the switching frequency is high to make the output current ripple low to avoid acoustic resonance. The cost of this method is an increase in switching loss and a decrease in the whole system efficiency. With the new igniting control scheme, the value of the inductor used for resonant ignition can be high and the switching frequency only increases a little bit in the steady state mode, and the inductor can still make the output current ripple low to avoid the acoustic resonance. It is good to keep high efficiency for the whole system.

Other advantages and features will become apparent from the following description, and from the claims.

DESCRIPTION OF THE PREFERRED EMBODIMENTS

Figure 9:
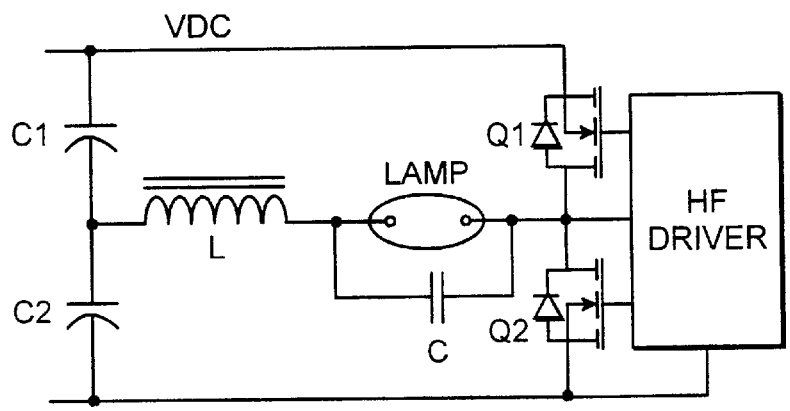
FIG. 9 shows the proposed invention circuit.
Figure 12:
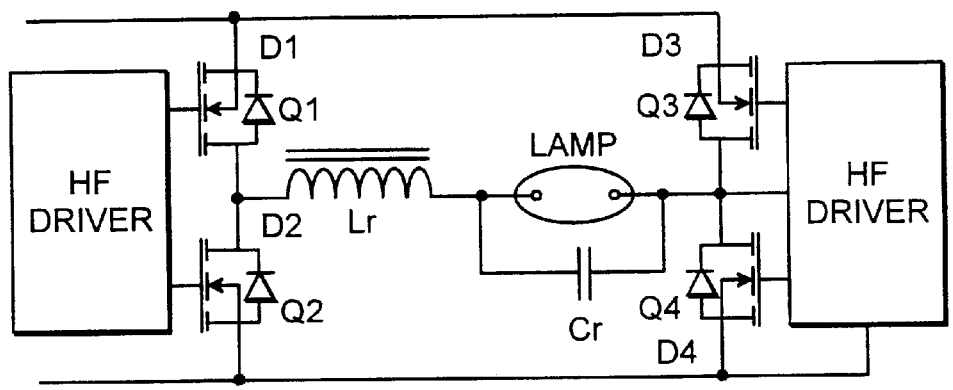
FIG. 12 shows another proposed invention circuit.

FIG. 9 shows a half bridge circuit schematic implementation of the present invention. FIG. 12 shows a full bridge circuit schematic implementation of the present invention. Which topology to choose is determined by the power level of the HID ballast. The operating principles of FIG. 9 and FIG. 12 are almost the same.

In the FIG. 9 half bridge circuit, L is a buck inductor and is also a resonant inductor. C is the resonant capacitor. The switches Q1, Q2 with freewheel diodes D1 and D2 are power switches. The circuit has two control loops. One is a current loop; and the other is a voltage loop. The ballast can work in two operating modes. One is a low frequency output working mode, and the other is high frequency lamp starting mode.

Figure 10:
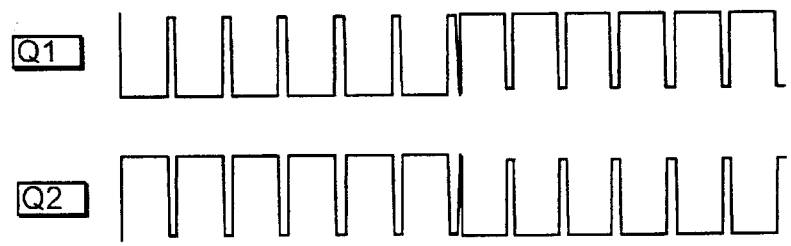
FIG. 10 shows the control signals for Q1 and Q2 in the FIG. 9 circuit.
Figure 11:
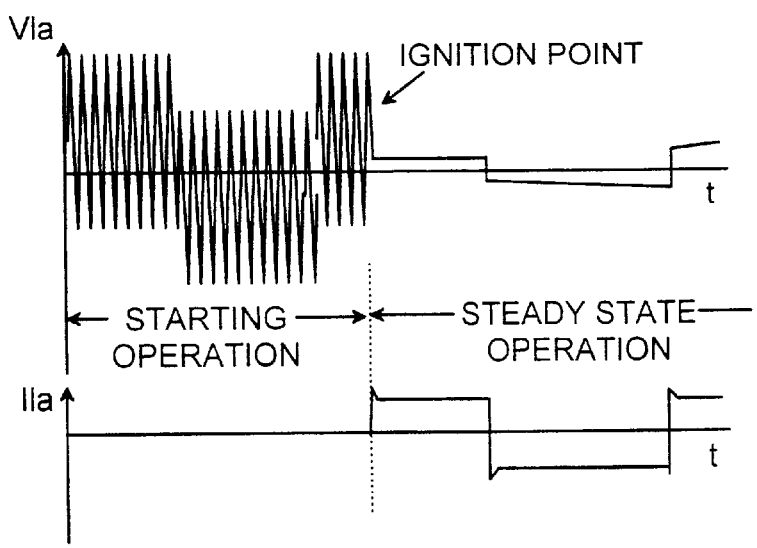
FIG. 11 shows the lamp's operating waveforms as driven by the FIG. 9 circuit.

In the low frequency output working mode, Q1, D2 and L form a buck chop circuit. The current in the inductor L is continuous. The output current is controlled by the current loop. As the power switch Q1 turns on, the DC bulk voltage source (not shown) supplies energy to the inductor and the lamp. As the power switch Q1 turns off, D2 turns on to continue the current flow in the inductor L1, and the inductor L releases its energy to the lamp. During the DC chopping of Q1 and D2, the current in the inductor L continues in one direction and the current on the lamp is a very low ripple DC current. Because the current in the inductor L has a very low high frequency ripple, it isn't necessary to use the second order filter formed by the output inductor L and the capacitor C parallel with the lamp to filter out the high frequency ripple current through the lamp to avoid acoustic resonance. In this case, the value of the capacitor parallel with the lamp will be determined by the lamp ignition. It is possible to make the circuit circulating current as low as possible and still obtain a voltage magnitude high enough to ignite the lamp. It is important to note that because the current in the inductor L is continuous, as the power switch Q1 turns off, the current of the inductor L passes only through the diode D2, regardless of whether the power switch Q2 is turned on or off. That is the reason that Q1 and Q2 are still turned on or off alternatively as shown in FIG. 10. In the same way, during the DC chopping of Q2 and D1, the current in the inductor L continuous in one direction, opposite to the one in the Q1 and D2 DC chopping case. In this way, there is a low frequency square waveform current to drive the lamp. The current loop forces the inductor L current to follow the reference current and control the lamp current. The frequency and amplitude of the current in the inductor L are determined by the reference current. The voltage loop detects the lamp voltage and controls the amplitude of the reference current. Thus, the lamp power is to controlled.

In high frequency lamp start mode, Q1 and Q2 turn on or off alternately. D1 and D2 offer a reactive current path for the resonant circuit. For a low circulating current resonant tank, the output impedance of the tank is high, due to the high value of the inductor L and the low value of the capacitor C. As the HID lamp is broken down, the lamp impedance will jump down to a low value and the circuit's Q will jump down to a low Q value too. Because the tank output impedance is too high to drive the lamp, the lamp can't be pushed from glow to arc and the lamp will extinguish. In order to decrease the output impedance and to push the lamp from the glow to the arc, a low frequency source is needed to add to the tank. Because the high frequency, high voltage, is generated by the circuit resonance and the Q of the resonant circuit is high (about 14 to 20), it is not necessary to keep the duty-cycle around 50%. In the high frequency lamp starting mode, the duty-cycle DM1 of Q1 is modulated by the output low frequency square waveform, that is, PWM control, and similarly for the duty-cycle DM2 of Q2. DM1 and DM2 have the following relation.

$$DM1=1-DM2$$

Figure 1:
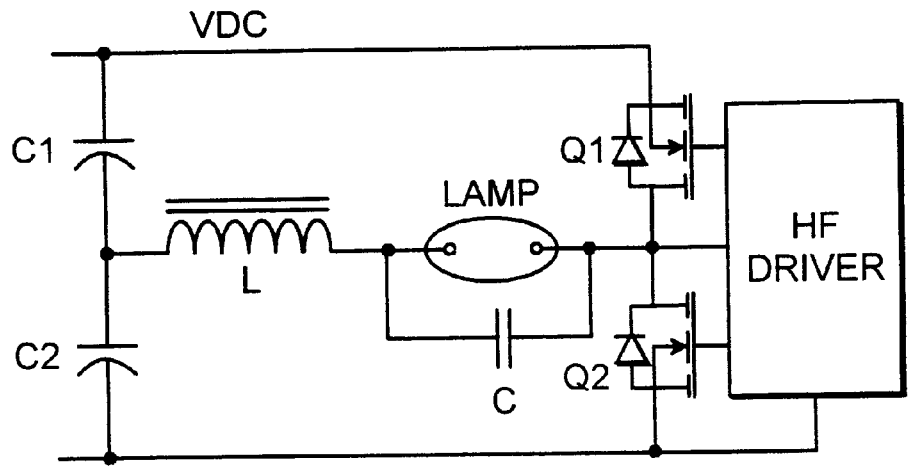
FIGS. 1 and 5 show topologies used, for example, in U.S. Pat. No. 5,932,976.
Figure 2:
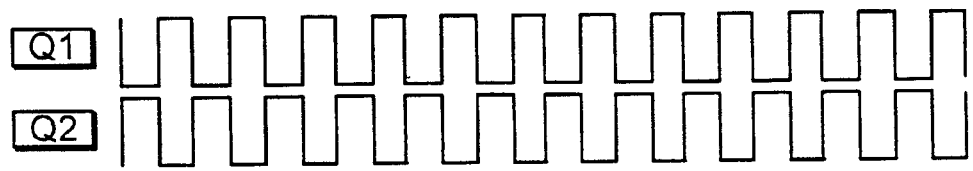
FIGS. 2 and 3 show the control signals for Q1 and Q2 in FIG. 1, respectively for high frequency igniting and low frequency driving cases.
Figure 3:
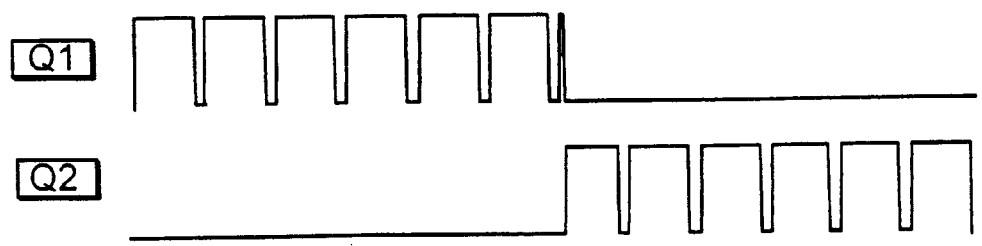
Figure 4:
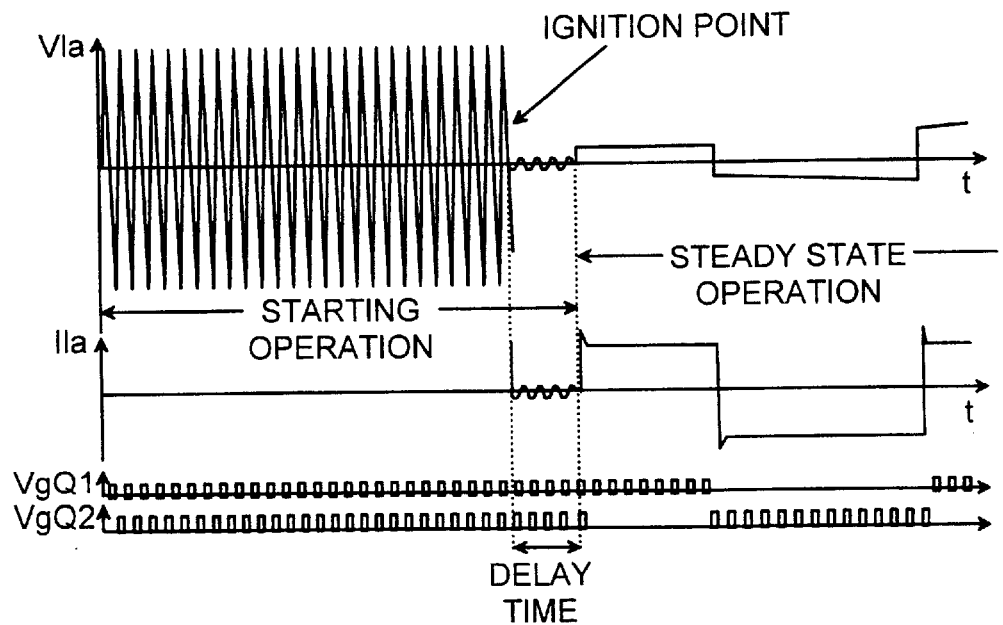
FIG. 4 shows the lamp's operating waveforms as driven by FIG. 1 circuit.
Figure 5:
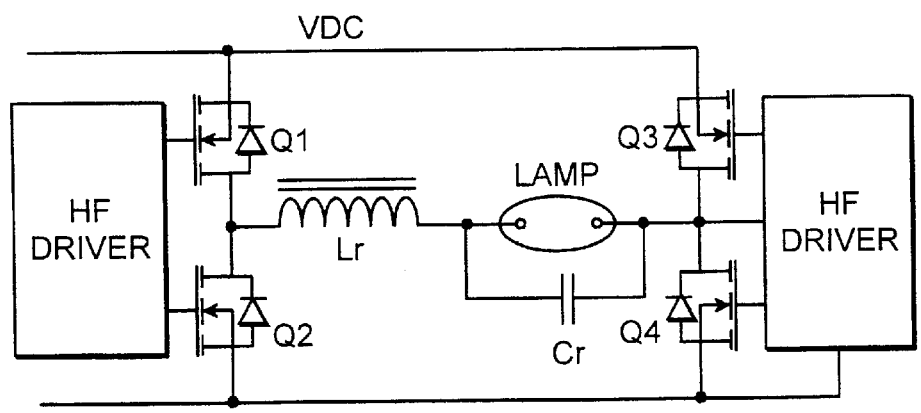
Figure 6:
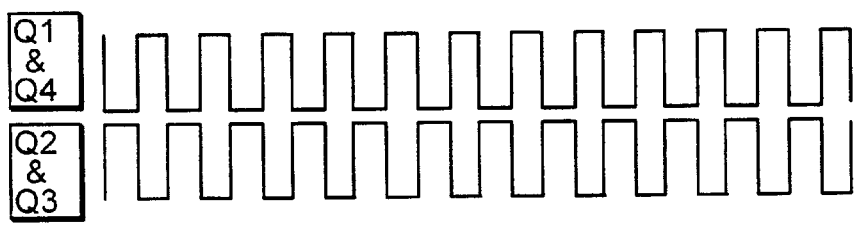
FIGS. 6 and 7 show the control signals for Q1, Q2, Q3 and Q4 in FIG. 5, respectively for high frequency igniting and low frequency driving cases.
Figure 7:
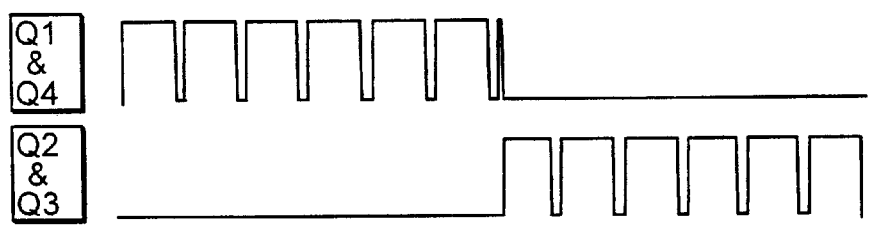
Figure 8:
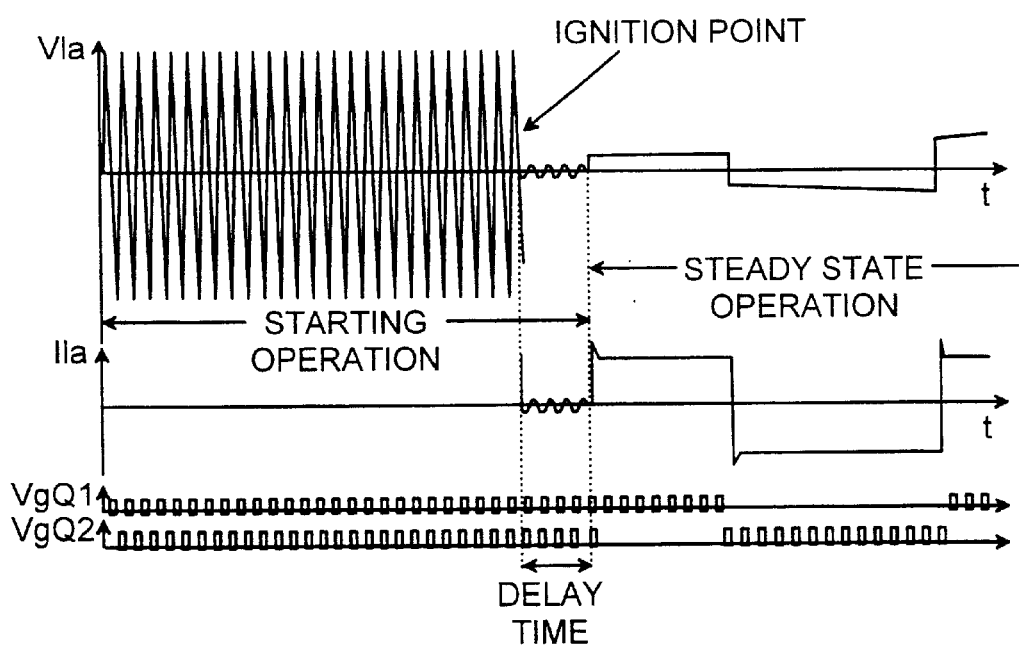
FIG. 8 shows the lamp's operating waveforms as driven by the FIG. 5 circuit.

Because the duty-cycles of Q1 and Q2 have been modulated, the voltage on the capacitor C parallel with the lamp is composed of a high frequency high voltage and a low frequency voltage whose amplitude is determined by the DC bulk voltage and the equivalent duty-cycle DM1. It is the low frequency voltage on the capacitor parallel with the lamp that provides the low frequency energy to drive the lamp as the lamp is ignited. In this way, the lamp can start at high frequency then transit to low frequency automatically. As the lamp current is set up, the current loop takes over to force the lamp current to follow the reference current waveform and control the lamp current. In this way, the ballast can shift from the high frequency starting mode to the low frequency working output mode smoothly and there is no delay time as in the circuit of FIGS. 4 and 8.

In the FIG. 12 full bridge circuit, Lr is a buck inductor and is also a resonant inductor. Cr is the resonant capacitor. The switches Q1, Q2, Q3, and Q4 with freewheel diodes D1, D2, D3, D4 are power switches. The circuit has two control loops. One is a current loop; and the other is a voltage loop. The ballast also works in two operating modes. One is a low frequency output working mode; and the other is a high frequency lamp starting mode.

Figure 13:
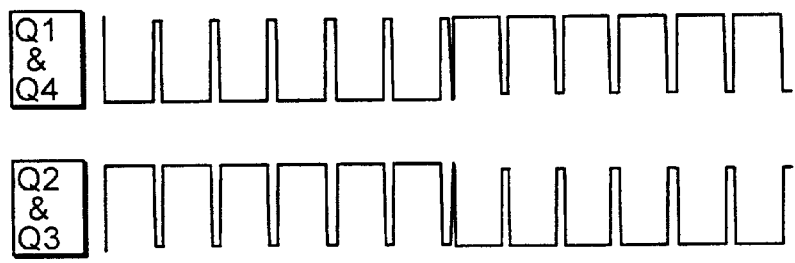
FIG. 13 shows one control method of Q1, Q2, Q3, and Q4 for the FIG. 12 circuit.
Figure 14:
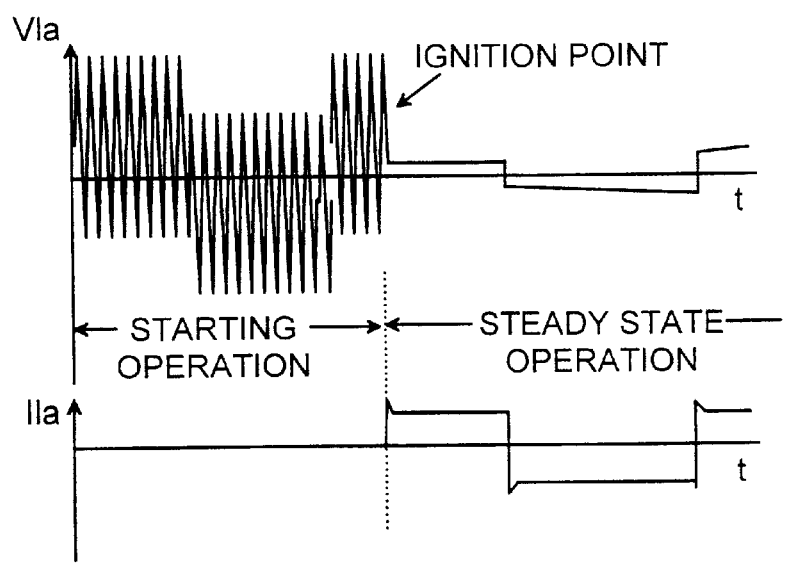
FIG. 14 shows the lamp's operating waveforms as driven by the FIG. 12 circuit with the FIG. 13 control method.

In the low frequency output working mode, Q1, D2 and Lr form a buck chop circuit. During the Q1, D2 and Lr DC chopping period, Q4 is turned on in the whole period. The current in the inductor Lr is continuous. The output current is controlled by the current loop. As the power switch Q1 turns on, the DC bulk voltage source (not shown) offers energy to the inductor and the lamp. As the power switch Q1 turns off, D2 turns on to continue the current in the inductor Lr, and the inductor Lr releases its energy to the lamp. During the DC chopping of Q1 and D2, the current in the inductor Lr continues in one direction and the current on the lamp is a very low ripple DC current. Because the current in the inductor Lr has a very low high frequency ripple, it isn't necessary to use the second order filter formed by the output inductor Lr and the capacitor Cr parallel with the lamp to filter out the high frequency ripple current through the lamp to avoid acoustic resonance. In this case, the value of the capacitor Cr parallel with the lamp will be determined by the lamp ignition. It is possible to make the resonant tank circulating current as low as possible and still obtain a voltage magnitude high enough to ignite the lamp. It is important to note that because the current in the inductor Lr is continuous, as the power switch Q1 turns off, the current of the inductor Lr passes only through the diode D2, regardless of whether the power switch Q2 is turned on or turned off. That is the reason that Q2 can turn on or off alternatively or off as shown in FIG. 13. In the same way, during the DC chopping of Q3 and D4, Q2 is turned on during the whole period. The current in the inductor Lr continues in one direction, opposite to the one in the Q1 and D2 DC chopping case. In this way, because of the DC chopping of Q1, D2, and Q3, D4, there is a low frequency square waveform current to drive the lamp. In the circuit, there is a current loop to force the inductor Lr current to follow the reference current. The frequency and amplitude of the current in the inductor Lr are determined by the frequency and amplitude of the reference current. It is the current loop that serves as the lamp current control. In the control circuit, there is a voltage loop to detect the lamp voltage and control the amplitude of the reference current. In this way, the lamp power can be controlled.

In high frequency lamp starting mode, there are two options. Option one is that Q1 and Q4 are turned on or off with Q2 and Q3 alternately, and D1, D2, D3, D4 offer the reactive current paths for the resonant circuit. Option two is that Q4 turns on, and Q1 and Q2 turn on or off alternately, and D1 and D2 offer a reactive current path for the resonant circuit. Which one should be chosen is determined by the DC bulk voltage and the circulating current stress.

For option one, Q1 and Q4 are turned on or off with Q2 and Q3 alternatively shown in FIG. 13. Due to the high value of the inductor Lr and low value of the capacitor Cr, the output impedance of the tank is high. As the HID lamp is broken down, the lamp impedance will jump down to a low value and the circuit's Q will jump down to a low Q value too. Because the tank output impedance is too high to drive the lamp, the lamp can't be pushed from glow to arc and the lamp will extinguish. In order to decrease the output impedance and to push the lamp from the glow to the arc, a low frequency source is needed to add to the tank. Because the high frequency, high voltage, is generated by the circuit resonance and the Q of the resonant circuit is high (about 14 to 20), in the high frequency lamp starting mode, the duty-cycle DM1 of Q1 and Q4 is modulated by the output low frequency square waveform, that is, PWM control, and so similarly for the duty-cycle DM2 of Q2 and Q3. DM1 and DM2 have the following relation.

$$DM1=1-DM2$$

Because the duty-cycles of Q1 and Q4 and Q2 and Q3 have been modulated, the voltage on the capacitor Cr parallel with the lamp is composed of a high frequency high voltage and a low frequency voltage whose amplitude is determined by the DC bulk voltage and the equivalent duty-cycle DM1. It is the low frequency voltage on the capacitor parallel with the lamp that supplies the low frequency energy to drive the lamp as the lamp is ignited. In this way, the lamp can start at high frequency then shift to low frequency automatically. As the lamp current is set up, the current loop serves to force the lamp current to follow the reference current waveform and control the lamp current. In this way, the ballast can shift from the high frequency starting mode to the low frequency working output mode smoothly and there is no delay time.

Figure 15A:
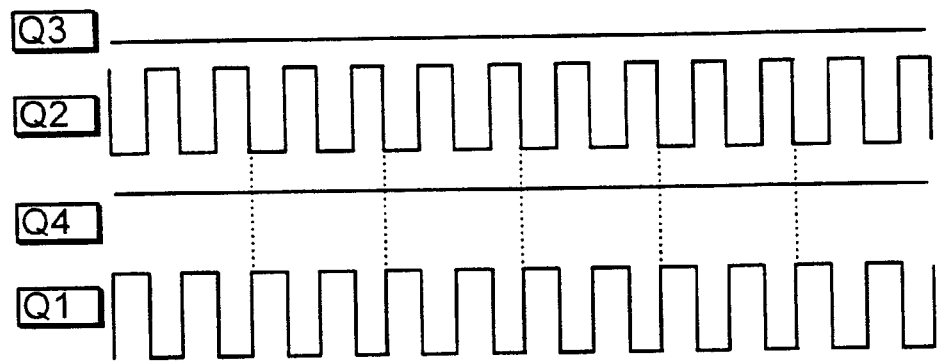
FIG. 15 shows the second control method of Q1, Q2, Q3, and Q4 for the FIG. 12 circuit.
Figure 15B:
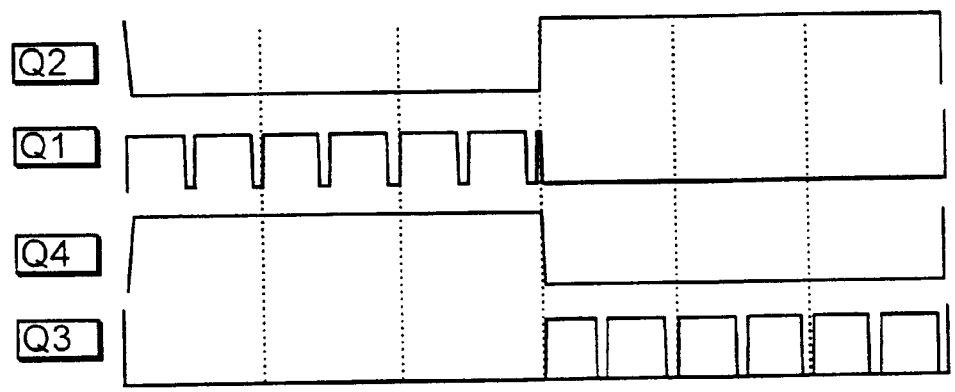
Figure 16:
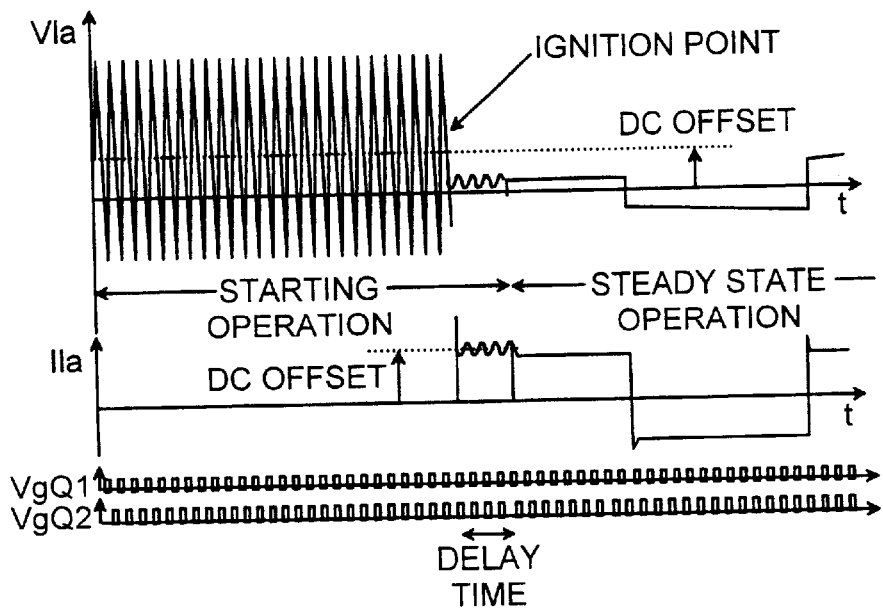
FIG. 16 shows the lamp's operating waveforms as driven by the FIG. 12 circuit with the FIG. 15 control method.

For option two, because Q4 turns on, and Q1 and Q2 turn on or off alternately as shown in FIG. 15(a), the voltage on the resonant capacitor Cr is composed of a high frequency, high voltage plus a DC voltage offset (FIG. 16) whose amplitude is determined by the DC bulk voltage and the duty-cycle of Q1. It is the high frequency, high voltage that breaks down the lamp. It is the DC voltage on Cr that pushes the lamp from the glow to the arc, as the lamp is broken down. As the lamp current is set up, the current loop serves to force the lamp current to follow the current reference. In this way, the ballast can shift from starting mode to normal mode automatically and there is no delay time as in the prior art.

Figure 17:
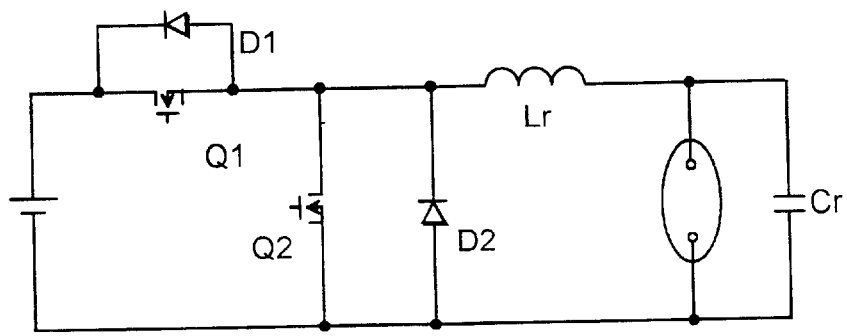
FIG. 17 shows a DC-type HID ballast circuit.
Figure 18:
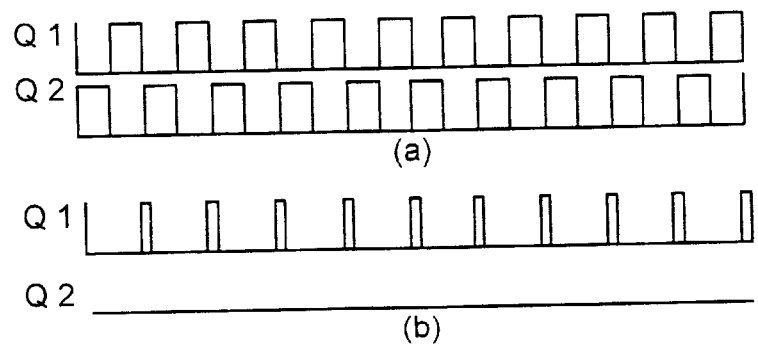
FIG. 18 shows the driving signal for the FIG. 17 circuit.
Figure 19:
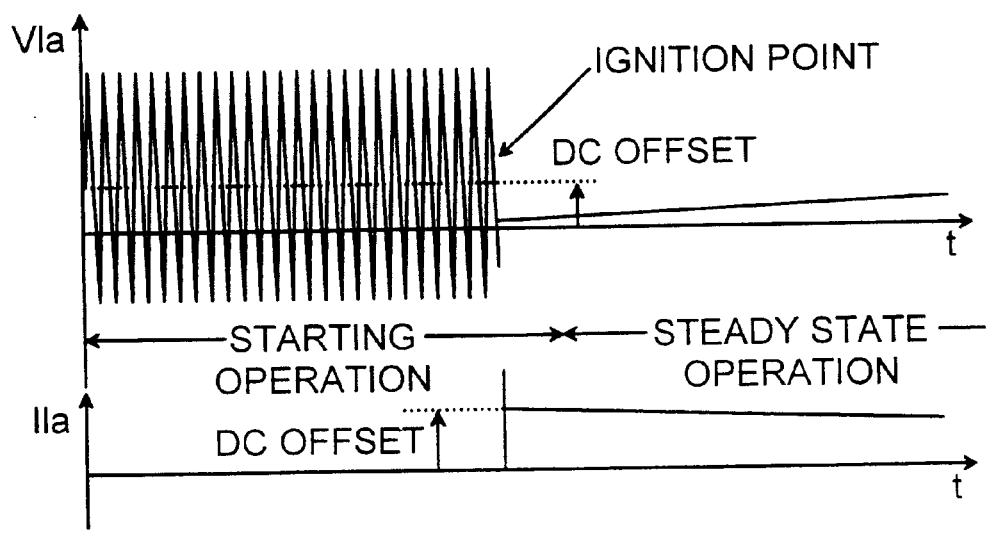
FIG. 19 shows the lamp's operating waveforms as driven by the FIG. 17 circuit with the FIG. 18 control method.

The described technique can also apply to a DC type HID lamp ballast. The power circuit is shown in FIG. 17, and the control PWM signals are shown in FIG. 18. In the DC HID ballast, there are a current loop and voltage loop to control the lamp current and the ballast output power. For starting mode, switches Q1 and Q2 are turned on or off alternately shown in FIG. 18(a). The buck inductor Lr will resonant with the capacitor parallel with the lamp to produce a high-frequency high voltage plus a DC voltage to break down the lamp. As the lamp is broken down, the DC voltage will push the lamp from glow to arc, and as the lamp current is set up, the lamp current will be forced to follow with the reference current. The voltage loop is used to control the reference current to control the input lamp power.

Other embodiments are also within the scope of the following claims.

What is claimed:

1. A lamp driving circuit, comprising:

an inverter circuit configured to invert a DC voltage to a high frequency voltage superimposed on a low frequency alternating voltage to ignite a lamp, said high frequency voltage having a DC component that ensures a transition from a glow discharge condition to an arc discharge condition when the lamp discharges; and a controller configured to operate said inverter circuit at a high frequency with an unbalanced duty cycle during an ignition mode, and to cause a DC current to run to the lamp after the lamp makes said transition to said arc discharge condition.

2. The driving circuit of claim 1, wherein said inverter circuit comprises a bridge inverter circuit having at least two power switches.

3. The driving circuit of claim 1, wherein said bridge inverter circuit comprises a half bridge inverter, in which two power switches are controlled by said controller to be alternately turned ON and OFF with said unbalanced duty cycle, said unbalanced duty cycle of said power switches being modulated between a first duty cycle and a second duty cycle by said controller during said ignition mode and a normal operation mode after the lamp has been ignited.

4. The driving circuit of claim 3, wherein said controller varies a switching frequency during each cycle of said first duty cycle and said second duty cycle to shift from a first frequency to a second frequency that is lower than said first frequency, and operating the two power switches at a fixed switching frequency with a modulated duty-cycle during said normal operation mode after the lamp has been ignited.

5. The driving circuit of claims 2, wherein, said bridge inverter circuit comprises a full bridge inverter, in which two pairs of power switches are controlled by said controller to be alternately turned ON and OFF with said unbalanced duty cycle, said unbalanced duty cycle of said two pairs of power switches being modulated by said controller between a first duty cycle and a second duty cycle during said ignition mode.

6. A method for controlling an operation of a high intensity discharge lamp driving circuit, comprising:

delivering a high frequency ignition voltage to a lamp during an ignition mode before the lamp is ignited, and inverting a DC voltage with an unbalanced duty cycle high frequency voltage that is superimposed on a low frequency alternating voltage to ignite the lamp during an ignition mode, such that when the lamp discharges, a DC component included in the high frequency voltage is added to the lamp, said DC component ensuring a transition from a glow discharge condition to an arc discharge condition, a DC current running to the lamp after the lamp makes the transition to the arc discharge condition.

7. The method of claim 6, wherein delivering a high frequency ignition voltage comprises using a half bridge inverter, in which two power switches are alternately turned ON and OFF with an unbalanced duty cycle, said unbalanced duty cycle of said two power switches being modulated between a first duty cycle and a second duty cycle during the ignition mode, and wherein only one switch of the two power switches is turned ON and OFF with a high frequency while an other switch of the two power switches is turned OFF during a normal operation mode after the lamp has been ignited.

8. The method of claim 6, wherein delivering a high frequency ignition voltage comprises using a full bridge inverter, in which two pairs of power switches are controlled to be alternately turned ON and OFF with an unbalanced duty cycle, said unbalanced duty cycle of the two pairs of power switches being modulated between a first duty cycle and a second duty cycle during the ignition mode, and wherein only one pair of power switches, of said two pairs of power switches, is tuned ON and OFF at a high frequency while a remaining pair of power switches, of said two pairs of power switches, is turned OFF during a normal operation mode after the lamp has been ignited.

9. A high intensity discharge lamp driving circuit, comprising:

a voltage producing device that delivers a high frequency ignition voltage to a lamp during an ignition mode to ignite said lamp; and means for controlling a switching of said voltage producing device from said ignition mode to a normal operation mode after a predetermined period of time after the lamp is ignited, so that said voltage producing device delivers a low frequency square wave voltage to the lamp during said normal operation mode, said voltage producing device including a bridge circuit having at least two power switches that convert a DC voltage to said high frequency ignition voltage, said high frequency ignition voltage being superimposed with a low frequency alternating voltage so as to appear on the high intensity discharge lamp during said ignition mode by modulating an unbalanced duty-cycle of said at least two power switches between a first duty cycle and a second duty cycle, a DC component being included in the high frequency voltage added to the lamp, said DC component ensuring a transition from a glow discharge condition to an arc discharge condition when the lamp discharges, while a DC current automatically runs to the lamp after the lamp makes said transition to said arc discharge condition.

10. The driving circuit of claim 9, wherein said bridge circuit comprises a half bridge inverter, in which two power switches are controlled by said control means to be alternately turned ON and OFF with an unbalanced duty cycle, said unbalanced duty cycle of said two power switches being modulated by said control means between a first duty cycle and a second duty cycle during said ignition mode and a normal operation mode after the lamp has been ignited.

11. The driving circuit of claim 9, wherein, said bridge circuit comprises a full bridge inverter, in which two pairs of power switches are controlled by said control means to be alternately turned ON and OFF with an unbalanced duty cycle, said unbalanced duty cycle of said two pairs of power switches being modulated by said control means between a first duty cycle and a second duty cycle during said ignition mode.

* * * * *